United States Patent Office 3,074,354
Patented Jan. 22, 1963

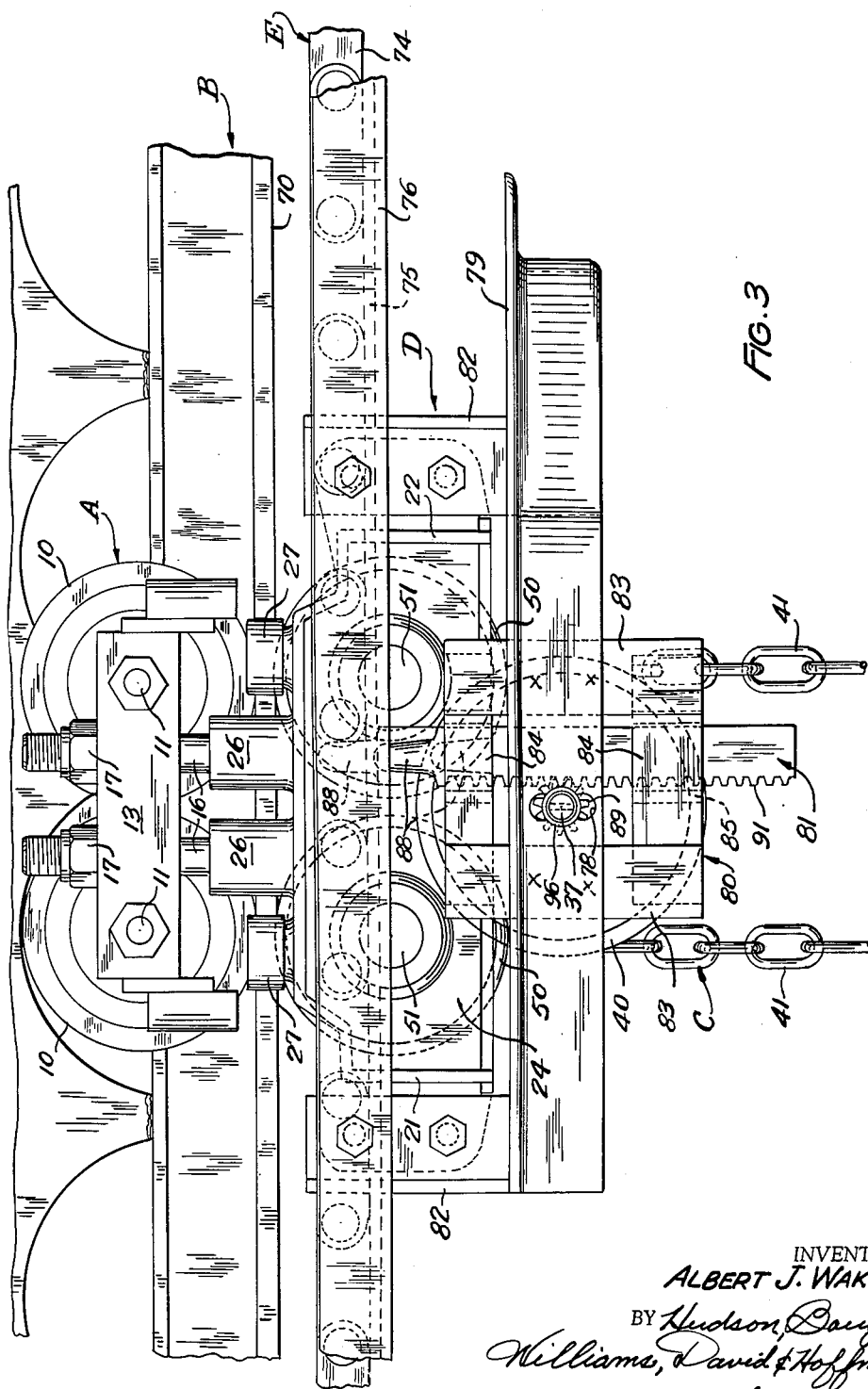

3,074,354
OVERHEAD MATERIAL HANDLING TROLLEYS
Albert J. Wakkila, Fairport Harbor, Ohio, assignor to The Cleveland Crane & Engineering Company, Wickliffe, Ohio, a corporation of Ohio
Filed May 28, 1958, Ser. No. 738,340
11 Claims. (Cl. 104—93)

The present invention relates to overhead material handling apparatus and more especiallly to power propelled trolleys movable along overhead tracks or rails.

One of the principal objects of the invention is to provide a novel and new self-propelled trolley for an overhead material handling system, wherein the self-propelling drive is disengageable so that the trolley can also be propelled along the overhead rail either by manual or by external power drive means.

Another object of the invention is to provide a novel self-propelled trolley for an overhead material handling system which trolley can be driven under its own power, hand propelled, driven by an independent chain drive mounted parallel to the rail upon which the trolley is mounted, or by other auxiliary apparatus.

Another object of the invention is to provide a novel self-propelled trolley movable along an overhead rail in an overhead material handling system and provided with means for disengaging the self-propelling drive for permitting the trolley to be moved along the rail manually or by an auxiliary drive external of the trolley.

Another object of the present invention is to provide a novel self-propelled trolley movable upon an overhead rail in an overhead material handling system wherein the trolley has a disengageable self-propelling drive for permitting the trolley to be propelled by an auxiliary chain drive mounted parallel to the rail and having means for disengaging both the self-propelling drive and the auxiliary chain drive at the same time so that the trolley can be freed for being moved along the overhead rail by other power or manual motive means.

Another object of the invention is the provision of a new and novel overhead carrier system comprising a trolley movable along an overhead track and a juxtaposed chain drive or other drive apparatus, the trolley having a disengageable self-propelling drive, a means for mechanically engaging the juxtaposed chain drive or other drive apparatus, and means for engaging the self-propelling drive drive and disengaging the chain drive, or disengaging the self-propelling drive and engaging the chain drive, or disengaging both the self-propelling drive and auxiliary drive for freeing the trolley for movement or braking by other power or manual means.

The invention resides in certain novel constructions and arrangements of parts, and further objects and advantages of the invention will appear from the following description of the preferred embodiment described with reference to the accompanying drawings, which form a part of this specification, and in which like reference characters designate corresponding parts throughout the several views, and wherein—

FIG. 3 shows a side elevational view of the tractor looking from the right of FIG. 1.

Figure 1:
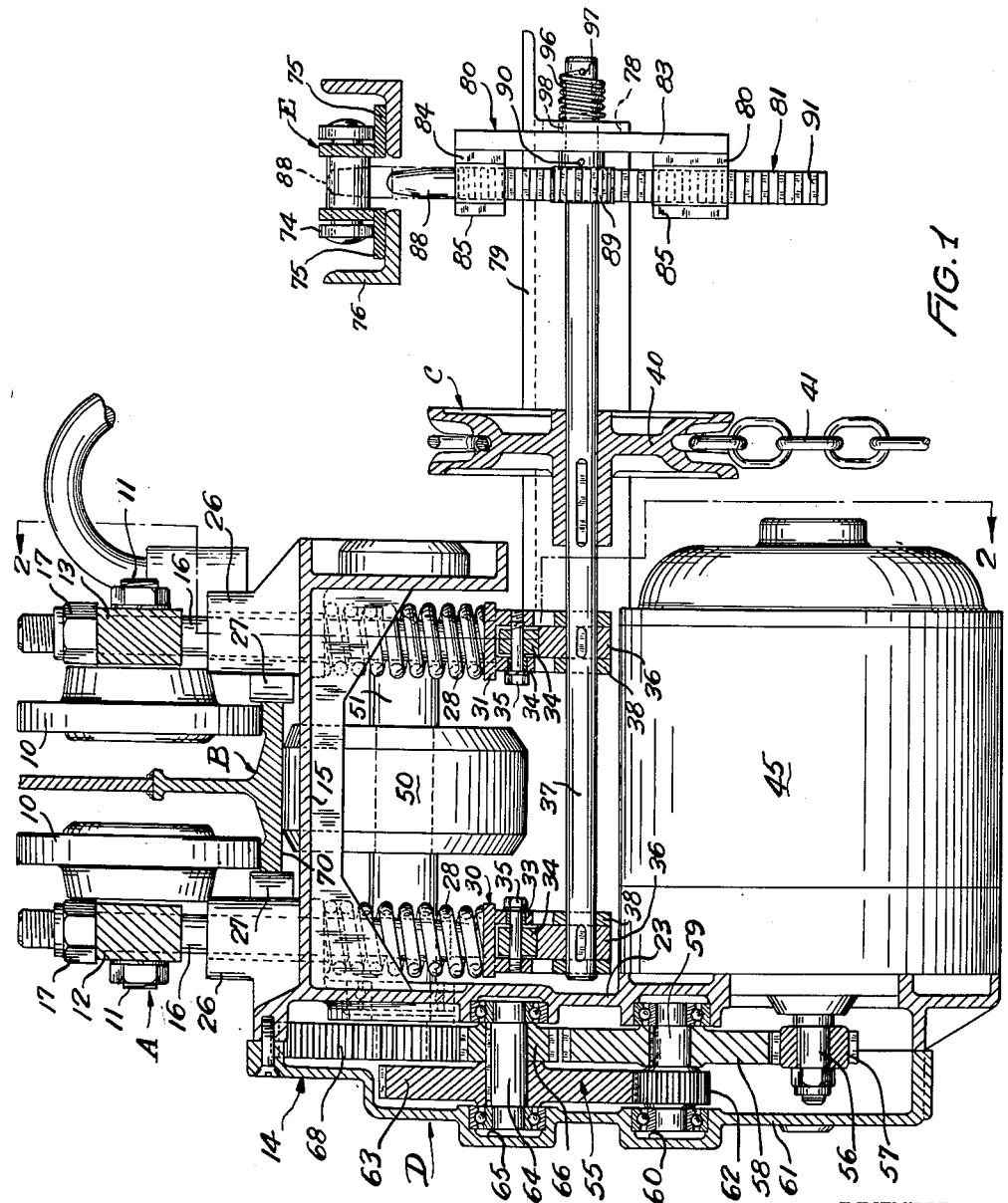
FIG. 1 shows an end of a self-propelled tractor mounted on a monorail with portions in vertical section perpendicularly to the longitudinal axis of the monorail and approximately along the central vertical plane of the tractor.

Although the illustrative embodiment of the invention will be described in detail, it is to be understood that the invention is not limited to the construction and arrangement of the parts shown and described, but is capable of being otherwise embodied and of being practiced and carried out in various ways. It is also to be understood that the phraseology or terminology employed herein is for the purpose of description and not of limitation, and there is no intention to limit the claims beyond the requirements of the prior art.

Referring to the drawings, the reference character A designates generally a trolley, and more especially a self-propelled tractor adapted to pull or push carriers in a known manner, supported on an overhead monorail track B. The self-propelled tractor A is provided with a control means such as a manually operated chain means C for engaging and disengaging a self-propelling drive by respectively raising and lowering the drive unit D in its entirety relative to the monorail B and for selectively engaging or disengaging an auxiliary chain drive E, for selectively disengaging both the self-propelling drive and the auxiliary drive E to free the tractor A so that it can be independently braked or moved along the overhead monorail B by manual or still other power means.

The tractor A comprises four symmetrically arranged wheels 10 bearing upon and guided along monorail B in a conventional manner. The wheels 10 are rotatably journaled upon stub shafts 11, having portions of reduced diameter projecting through suitable apertures in two side sills 12 and 13. The stub shafts 11 are secured in the side sills by conventional means such as nuts threaded onto the ends of the stub shafts 11. The self-propelling drive unit D is supported in depending relationship from the side sills 12, 13 by four symmetrically arranged rods 16, the upper ends of which extend through openings in the sills between the stub shafts 11. Nuts 17 threaded onto the upwardly protruding ends of the rods 16 not only limit the movement of the rods relative to the sills in a downwardly direction, but provide means for adjusting the rods relative to the sills in a vertical direction.

The drive unit D comprises a frame 14 including a top side or wall 15, depending substantially vertical front and rear end walls 21 and 22, a relatively large, longitudinally extending rear side wall 23 and a smaller and relatively narrow front side wall 24. Each of the front and rear end walls 21 and 22 have conventional draw bar mounting ears adapted to mount a draw bar. The top wall 15 is provided with four symmetrically arranged, internally bushed rod guide hubs or bosses 26 for slidably receiving the rods 16 and carries four symmetrically arranged conventional guide rollers 27 suitably mounted upon the upper side thereof and engaging the edges of the tread flanges of the monorail B for guiding the tractor A along the monorail.

The frame 14 is vertically movable along the rods 16 and is resiliently supported or carried thereby upon pairs of helical springs 28 surrounding the lower ends of the rods 16 at opposite sides of the tractor. The pairs of springs 28 are interposed between the lower side of the top wall 15 of the frame 14 and two cam followers 30, one each being mounted upon the reduced lower ends of each of the pairs of rods 16 positioned on either side of the trolley A and monorail B. The cam followers 30 are identical and are comprised of plates 31 provided with bushings 32 rigidly secured therein for slidably receiving the reduced lower ends of the spring rods 16. In addition to the bushings 32, the cam followers 30 are each comprised of a pair of downwardly extending parallel brackets 33 having a cam roller 34 rotatably secured therebetween by conventional means such as a cap screw 35 passed through an internally bushed portion of one of the brackets 33 and the roller 34 and threaded into the opposite bracket 33.

The lower portions of the rollers 34 extend below the brackets 33 and engage and ride upon specially shaped cams 36 keyed to a transverse cam or support shaft 37 rotatably supported in two pairs of bell crank or yoke-like members or supports 38 located at opposite sides of the trolley and of a longitudinally extending vertical central plane of the monorail B. The pair of yoke members 38 at either side of the trolley are located on the shaft 37 immediately adjacent to the cam 36 at that particular side of the trolley and with the shaft 37 extending loosely through the elbow or bight portion of members 38. The free ends of the yoke members 38 at the respective sides of the trolley are connected to the rod 16 at that particular side by screws 39 passing through aligned openings in the respective end of the yoke members 38 and the lower terminal ends of the rods 16. The lower ends of the rods 16 in juxtaposition with the yoke members 38 are flattened or machined to a thickness slightly greater than the width of the cam rollers 34. Accordingly the cam shaft 37 and the cams 36 keyed thereto are rotatably supported by the yoke members 38 against axially movement.

The control chain means C for turning the cam shaft 37 comprises a chain wheel 40 rigidly keyed to the shaft 37 and having a continuous or band-like pull chain 41 looped thereabout in a conventional manner for manually oscillating the shaft 37 to raise and lower the frame 14 and the self-propelling drive unit D attached thereto. However, it is to be understood that other means can be utilized for actuating or turning camshaft 37 either manually or automatically such as by means of cooperating cams and/or trips and switches, etc., spaced along the rail and mounted on the trolley.

The self-propelling drive unit D also comprises an electric motor 45 connected to the lower part of the rear wall 23 of the frame 14 and connected to a pair of drive wheels or rollers 48, preferably having a rubber tread 50 rigidly secured to a pair of horizontal parallel shafts 51, which shafts are suitably journaled in the upper part of the frame 14, and more particularly in the side walls 23 and 24 thereof, by a drive transmission 55 comprising a gear train connecting a drive shaft 56 of the electric motor 45 with the shafts 51 upon which the drive wheels or rollers 48 are mounted.

The reduction gearing shown comprises a small drive gear 57 rigidly secured to the drive shaft 56 of the electric motor 45 and continuously in mesh with a large gear wheel 58 keyed to a countershaft 59 frictionlessly journaled in a suitable manner in the side wall 23 of the frame 14 and in a cup-shaped hub portion 60 of a gear train cover plate 61 secured to the side wall 23 of the housing 14 in a conventional manner, such as with machine screws. The countershaft 59 carries a small gear wheel 62 keyed thereto and positioned in side-by-side relationship with the large gear wheel 58. The gear wheel 62 is in mesh with and drives a large gear wheel 63 keyed to a second countershaft 64 journaled in the housing side wall 23 above the countershaft 59 and in a well 65 in the cover plate 61 by means of antifriction journal bearings. A small gear wheel 66, keyed to the second countershaft 64, meshes with a pair of large gear driven wheels 68 keyed to the ends of the drive wheel shafts 51 extending outwardly through the housing side wall 23. The large driven gear wheels 68 on the shafts 51 which carry drive wheels or rollers 48 are disposed at equal distances from the gear wheel 66 and are driven thereby at a uniform rate and in the same direction for propelling the tractor along the monorail when the drive wheels or rollers 48 are engaged with an undersurface 70 of the monorail B.

Each of cams 36 have an undulant peripheral surface comprising an elevated or up seat portion 71 in its lobe and two lower or down seat portions 72 and 73 respectively located 90° on either side of the seat portion 71 and adapted to seat the respective roller 34 which engages therewith. The seats 71, 72 and 73 are each formed by arcuate or semi-circular depressions successively spaced 90° apart. The construction is such that the helical springs 28 are compressed and the frame 14 is consequently biased upwardly toward the monorail B with the drive wheels 48 being accordingly biased into engagement with the undersurface 70 of the rail B when the rollers 34 of cam followers 30 are located in the up seat or lobe portions 71 and when in either of the lower or down seat portions 72 and 73 the frame 14 and the drive wheels 48 supported thereby are allowed to drop clear of the rail. The drive wheels 48 when in their disengaged position, are selectively engaged with the undersurface 70 of the monorail B to connect the self-propelling drive D by turning the cam shaft 37 through the required angular increment which in the present instance is 90°, so as to move the up cam seats 71 to positions underneath the respective rollers 34 of cam followers 30, to compress the helical springs 28 and raise the frame 14 sufficiently for the drive wheels 48 to frictionally engage the underside 70 of the monorail B. The pressure with which the drive wheels 48 engage the underside of the rail B can be adjusted by means of the nuts 17 on the upper ends of the shafts 16.

Figure 2:
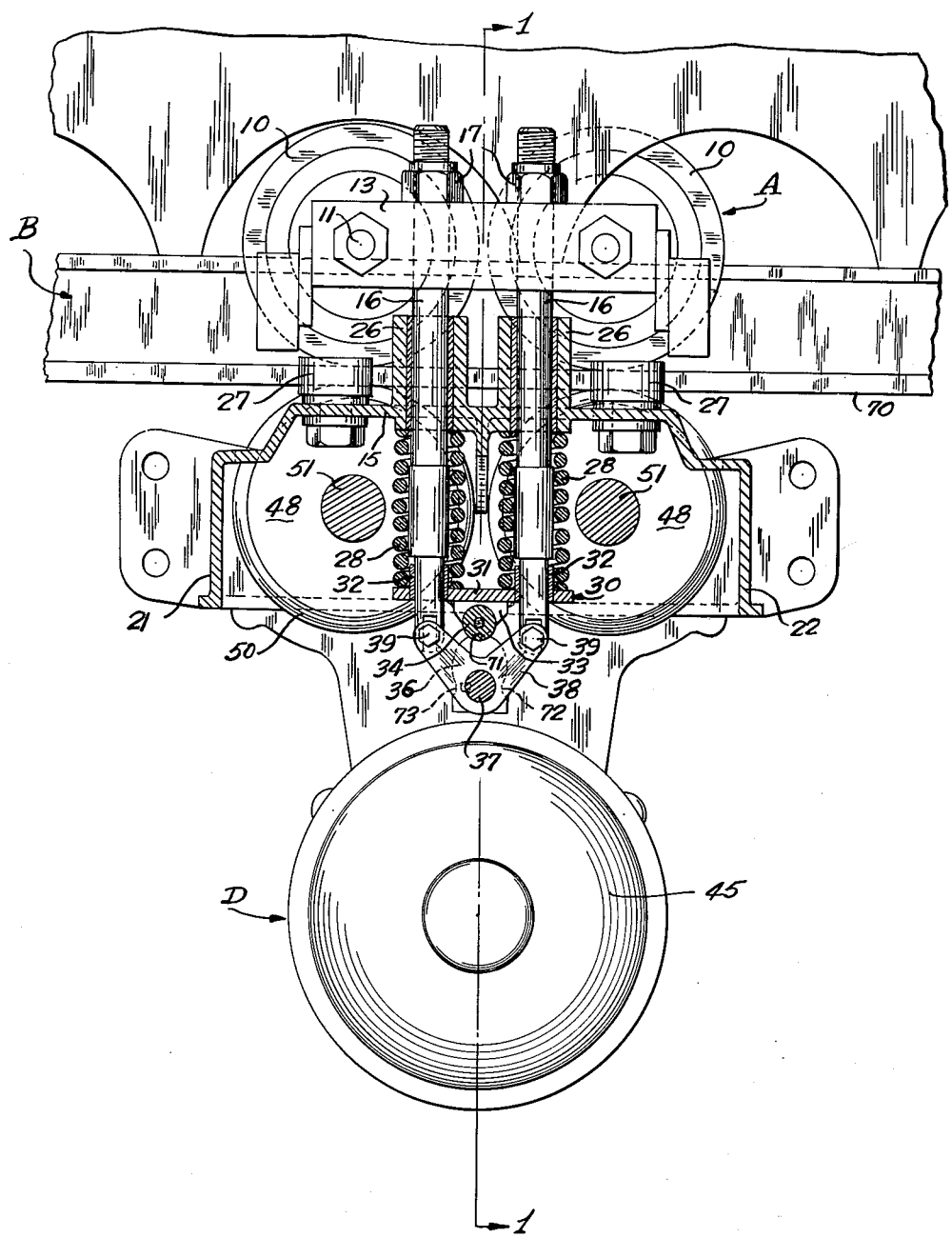
FIG. 2 shows a side view of the tractor and monorail with portions broken away and in vertical sectional view approximately along line 2—2 of FIG. 1.

The self-propelling drive D of the trolley A is disengaged by turning the camshaft 37 through an angle of approximately 90° from the engaged position, in either a clockwise or a counterclockwise direction, FIG. 2, and, respectively, seating the cam follower rollers 34 in the depressions forming lower seats 73 and 72. This causes the frame 14 to be lowered sufficiently for drive wheels 48 to clear the underside of the rail B. When the cam rollers 34 are seated in the lower seats 73 both the self-propelling drive D and the auxiliary drive means E are disengaged and the trolley A is free to be independently braked or moved along the monorail B. When the lower cam seats 72 are engaged by the cam rollers 34, the auxiliary drive means E, which forms another important feature of the present invention, is engaged for propelling the trolley along the monorail B.

In the embodiment shown the auxiliary drive comprises a chain drive apparatus E, of a type conventionally used with many material handling conveyor systems in warehouses and manufacturing plants, located alongside the monorail B. The auxiliary chain drive apparatus E, as shown, comprises a driven sprocket chain 74 slidable upon a pair of laterally spaced apart longitudinally extending bearing pads 75 supported by a pair of angle guides 76 disposed in longitudinal, side by side relationship with monorail B. The chain drive apparatus E is supported in a conventional manner so as to be disposed parallel to and alongside the monorail B but preferably at a level which is slightly below the level of the monorail. The cam shaft 37 projects outwardly of the tractor proper and its projecting end extends through a vertically elongated opening 78 in a generally U-shaped frame 79, which opening permits vertical movement of the frame relative to the shaft. The frame 79 supports a plunger guide assembly 80 having a plunger 81 slidably disposed therein for selectively connecting the tractor A to the chain drive apparatus E after the self-propelling drive unit D of the tractor A has been disengaged. The U-shaped frame 79 is rigidly secured, preferably by using bolts and nuts, to the frame 14 of the tractor A by means of upwardly extending parallel angle frame segments 82 which are integrally connected to the frame 79.

The plunger guide assembly 80 is a box-like frame structure and is rigidly secured to the inner periphery of the frame 79 preferably by welding. The box-like frame 80 comprises a pair of spaced apart and vertically arranged rectangular plates 83 having a pair of vertically spaced horizontal pads 84, each mounting a channel piece 85 for forming rigid guide sleeves for slidably guiding the plunger 81 therein. The plunger 81, of rectangular cross-section, is slidably supported in the aligned guide sleeves for up and down or vertical movement in such a manner that a rounded and tapered upper end 88 thereof may be selectively projected between the links of the conveyor sprocket chain 74 of the chain drive apparatus E by plunger actuating means. The plunger actuating means comprises a small pinion 89 rigidly secured, preferably by a setscrew 90, to the camshaft 37 adjacent to the outer end of the latter, and in mesh with a toothed rack 91 formed in one side of plunger 81. However, it is to be understood that other means can be used for moving the plunger 81 up and down for engaging and disengaging the auxiliary chain drive E.

A torsion spring 96 on the outer terminal end of the camshaft 37 extending through and beyond the frame 79 has a tang 97 on one end secured to the extreme outer end of the camshaft and a second tang 98 on its other end secured to an adjoining outer peripheral portion of the frame 79. Torsion spring 96 normally biases the plunger 81 in an upwardly direction so as to tend to retain the same in driving engagement with the chain 74 of the drive apparatus E when the plunger 81 is engaged therewith and to prevent the self-disengagement of the plunger 81 with the chain 74 due to jars, gravitational forces, vibrations, etc. When the self-propelling drive D is engaged and the auxiliary drive E disengaged, the combined resilient biasing forces of the four helical springs 28 urging the tractor drive wheels 48 into engagement with rail B will also be pushing the cam followers 34 with an equal force, into the up seat portions 71 of the cams 36 keyed to the camshaft 37. This will tend to keep the camshaft 37 from turning even through it is biased by the torsion spring 97 in a counterclockwise direction, as seen in FIG. 3. The down seats 73 have particularly steep sides such that the spring 96 will not be sufficient to lift the follower rollers 34 out of them even though the rollers are merely held therein by the weight of the frame 14, etc. In a similar manner, the down seats 72 of the cams 36 will assist the torsion spring 96 in maintaining the plunger 81 in driving engagement with the chain drive apparatus E when the same is engaged. As one proposed alternative construction a suitable type of spring press detent and cooperating apertures may be employed to hold the shaft 37 in any one of its three operative positions.

While I have shown and described a specific embodiment in accordance with my invention, it is understood that the same is susceptible of various changes and modifications, as known to a person skilled in the art, and I intend to cover all such changes and modifications coming within the scope of the appended claims.

Having thus described my invention, I claim:

1. In a carrier type material handling system, an overhead track, a trolley for movement along said overhead track, said trolley comprising a frame, means including a rail wheel for suspending said frame from said overhead track, drive means supported by said frame and connected to said track for propelling said trolley along said overhead track, auxiliary drive means in juxtaposition with said overhead track and coextensive with at least a portion thereof for propelling said trolley along said overhead track, and means for disconnecting said track, said drive means and connecting said trolley to said auxiliary drive means.

2. In a trolley for movement along an overhead track, rail wheel means adapted to engage and move along said overhead track, a frame, means for dependingly and resiliently supporting said frame from said rail wheel means for limited linear up and down movement relative to said rail wheel means, drive means including a motor and drive wheel means supported by said frame for movement therewith, said drive means being independent of said rail wheel means, means for moving said frame and the drive wheel means upwardly for engaging said drive wheel means with the underside of the track and for moving said frame and the drive wheel means downwardly for disengaging said drive wheel means and permitting the trolley to be moved or braked independently of said drive means.

3. In a carrier type material handling system, an overhead track, a trolley movable along said overhead track, said trolley comprising a frame, means including a rail wheel for suspending said frame from said overhead track, drive means supported by said frame beneath said track for propelling said trolley along said track, by frictionally engaging said track auxiliary power means in juxtaposition with said track and coextensive with at least a portion thereof for propelling said trolley along said overhead track, and means for raising and lowering said drive means relative to said overhead track for respectively engaging said drive means with said track and disengaging said drive means and said track and engaging said auxiliary power means with said trolley for propelling said trolley along said overhead track.

4. In an overhead material handling system, a trolley for movement along an overhead track and comprising, track wheel means adapted to move along the overhead track, a frame, means mounting said frame for up and down movement relative to said track wheel means, drive means for propelling the trolley along the track, drive wheel means journaled in said frame beneath the track for up and down movement with the frame, said drive means and said drive wheel means being independent of said track wheel means, actuating means for moving said frame and drive wheel means upwardly relative to the track for engaging said drive wheel means with the overhead track and for moving the frame and the drive wheel means downwardly relative to the track for releasing said drive wheel means from engagement with the overhead track and permitting the trolley to be moved or braked independently of said drive means, said actuating means comprising a cam shaft supported by said track wheel means, cam means rigidly secured to said cam shaft, cam follower means, and resilient means disposed between said frame and said cam follower means for resiliently supporting said frame on said cam follower means.

5. In an overhead material handling system, an overhead track, a trolley movable along said overhead track and comprising rail wheel means adapted to move along said overhead track, a frame, means mounting said frame for up and down movement relative to said rail wheel means, drive means for propelling the trolley along the track including drive wheel means supported by said frame beneath the track for up and down movement with the frame, actuating means for moving said frame and drive wheel means upwardly relative to the track for engaging said drive wheel means with said overhead track and for moving the frame and the drive wheel means downwardly relative to the track for releasing said drive wheel means from engaging with said overhead track and permitting the trolley to be moved or braked independently of said drive means, said actuating means comprising a cam shaft supported on said rail wheel means, cam means rigidly secured to said cam shaft, cam follower means, spring means disposed between said frame and said cam follower means for resiliently supporting said frame on said cam shaft, auxiliary drive means in juxtaposition with said overhead track and coextensive with at least a segment thereof, and movable plunger means connected to said cam shaft for engaging said auxiliary drive means, said cam shaft being adapted to be turned to one predetermined angular position for moving said frame upwardly to engage said drive wheel means with said overhead track and to another predetermined angular position to allow said frame to move downwardly to disengage said drive wheel means from said overhead track and engage said plunger means with auxiliary drive means and to a third angular position in which said drive wheel means is disengaged from said track and said plunger means is disengaged from said auxiliary drive means.

6. In an apparatus movable along an overhead rail and comprising frame means, track wheel means supporting said frame means for movement along said rail, traction wheel means carried by said frame means for propelling said trolley along said rail, drive means for said traction wheel means, said drive means being independent of said track wheel means, and means operatively connecting said traction wheel means and said drive means, means slideably supporting said frame means in said track wheel means for linear movement transversely of said rail, and means for moving said frame means transversely of said rail to engage and disengage said traction wheel means with said rail.

7. In an apparatus movable along an overhead rail and comprising frame means, track wheel means supporting said frame means for movement along said rail, traction wheel means carried by said frame means for propelling said apparatus along said rail, drive means for said traction wheel means, said drive means being independent of said track wheel means, and means operatively connecting said traction wheel means and said drive means, means slideably supporting said frame means in said track means for linear movement transversely of said rail, and means including a rotatable cam member interposed between said frame means and said track wheel means for moving said frame means transversely of said rail to engage and disengage said traction wheel means with said rail, and means for rotating said cam.

8. In an apparatus movable along an overhead rail having an auxiliary drive means adjacent thereto and coextensive with at least a portion thereof and said apparatus having a traction wheel drive means for propelling said apparatus along said rail, the improvement comprising control means for connecting and disconnecting said traction wheel drive means, connector means engageable and disengageable with said auxiliary drive means, and means for operating said control means for connecting and disconnecting said traction wheel drive means and for operating said connector means for disconnecting and connecting said connector means from and to said auxiliary drive means.

9. In an apparatus movable along an overhead rail having an auxiliary drive means adjacent thereto and coextensive with at least a portion thereof and said apparatus having frame means, track wheel means supporting said frame means for movement along said rail, traction wheel means carried by said frame means for propelling said trolley along said rail, drive means for said traction wheel means, and means operatively connecting said traction wheel means and said drive means, the improvement comprising means for supporting said traction wheel for movement into and out of engagement with said rail, connector means engageable and disengageable with said auxiliary drive means, and means for moving said traction wheel into and out of engagement with said rail and said connector means out of and into engagement with said auxiliary drive means.

10. In an apparatus movable along an overhead rail having an auxiliary drive means adjacent thereto and coextensive with at least a portion thereof and said apparatus having a tractor wheel drive means for propelling said apparatus along said rail, the improvement comprising control means including a movable member for connecting and disconnecting said tractor wheel drive means, connector means engageable and disengageable with said auxiliary drive means, means operatively connecting said connector means to said movable member, and means for moving said movable member for connecting and disconnecting said traction wheel drive means for disconnecting and connecting said connector means from said auxiliary drive means.

11. In an apparatus movable along an overhead rail having an auxiliary drive means adjacent thereto and coextensive with at least a portion thereof and said apparatus having frame means, track wheel means supporting said frame means for movement along said rail, traction wheel means carried by said frame means for propelling said trolley along said rail, drive means for said traction wheel means, and means operatively connecting said traction wheel means and said drive means, the improvement comprising means for supporting said traction wheel for movement into and out of engagement with said rail, connector means engageable and disengageable with said auxiliary drive means, a rotatable cam member for moving said traction wheel into and out of engagement with said rail, and means operatively connecting said connector means with said cam member for moving said connector means out of and into engagement with said auxiliary drive means upon rotation of said rotatable cam member.

References Cited in the file of this patent
UNITED STATES PATENTS

| | | |
|---|---|---|
| 841,821 | Smead | Jan. 22, 1907 |
| 1,078,102 | Manly | Nov. 11, 1913 |
| 1,372,761 | McBride | Mar. 29, 1921 |
| 1,864,323 | Sheridan | June 21, 1932 |
| 2,018,087 | Plass | Oct. 22, 1935 |
| 2,863,398 | Granath | Dec. 9, 1958 |